UNITED STATES PATENT OFFICE.

JOHN ZOLTOWSKI, OF MILWAUKEE, WISCONSIN.

WATERPROOFING LEATHER, CLOTH, OR WOOD.

1,391,088. Specification of Letters Patent. Patented Sept. 20, 1921.

No Drawing. Application filed April 13, 1921. Serial No. 461,033.

*To all whom it may concern:*

Be it known that I, JOHN ZOLTOWSKI, citizen of Poland, residing at Milwaukee, in the county of Milwaukee and State of Wisconsin, have invented certain new and useful Improvements in Waterproofing Leather, Cloth, or Wood, of which the following is a specification.

This invention relates to a composition for water-proofing leather, cloth, or wooden articles, the improved composition being more particularly intended for application by rubbing, to the material to be water-proofed, and may be used for water-proofing boots, shoes or any other leather, cloth or wooden articles or object.

The invention has for an object to provide a novel and improved composition for water-proofing leather, cloth or wood, characterized by cheapness of cost and efficiency of action.

For further comprehension of the invention reference will be had to the following specification in which I have set forth in detail the manner of making the improved composition, the features of novelty being more particularly set forth in the appended claims.

In making my improved water-proofing composition I employ lard, shoemakers' wax, and crude turpentine, these ingredients being preferably employed in the proportion of three parts of lard, one part of shoemakers' wax, and one part of crude turpentine.

In preparing the composition these ingredients may either be heated separately to a sufficient temperature to render them fluid and then placed in a common vessel, or heated together in a single vessel. The fluid mixture is then thoroughly stirred or agitated to properly mix the ingredients and may then be poured into containers of the desired size and allowed to cool.

The composition thus manufactured is applied to the leather cloth or wood by rubbing it well into the pores of the material and provides an efficient and inexpensive means for water-proofing the leather, cloth, or wood.

Having thus described my invention what I claim as new and desire to protect by Letters Patent of the United States is as follows:

1. A water-proofing composition for leather, cloth, or wood consisting of a mixture of lard, shoemakers' wax, and crude turpentine.

2. A water-proofing composition for leather, cloth, or wood consisting of a mixture of three parts of lard, one part of shoemakers' wax, and one part of crude turpentine.

In testimony whereof I have affixed my signature.

JOHN ZOLTOWSKI.